US010834865B2

(12) United States Patent
Freed (10) Patent No.: US 10,834,865 B2
(45) Date of Patent: Nov. 17, 2020

(54) FURROW CLOSING WHEEL ASSEMBLY (71) Applicant: Brian E. Freed, Lexington, IL (US)

(72) Inventor: Brian E. Freed, Lexington, IL (US)

(73) Assignee: AG FOCUS LLC, Lexington, IL (US)

( * ) Notice: Subject to any disclaimer, the term of this patent is extended or adjusted under 35 U.S.C. 154(b) by 187 days.

(21) Appl. No.: 15/968,640

(22) Filed: May 1, 2018

(65) Prior Publication Data

US 2018/0317377 A1 Nov. 8, 2018

Related U.S. Application Data (60) Provisional application No. 62/500,357, filed on May 2, 2017.

(51) Int. Cl.
*A01C 5/06* (2006.01)
(52) U.S. Cl.
CPC .............. *A01C 5/068* (2013.01); *A01C 5/066* (2013.01)
(58) Field of Classification Search
CPC ......... A01C 5/066; A01C 5/068; B60B 15/02; B60B 15/023; B60B 15/025
USPC ........................................................ 172/753
See application file for complete search history.

(56) References Cited

U.S. PATENT DOCUMENTS

| 204,988 | A | * | 6/1878 | McColm | A01B 21/04 172/548 |
| 442,538 | A | * | 12/1890 | Parker | A01B 21/04 172/548 |
| 489,037 | A | * | 1/1893 | Roadhouse | A01C 7/08 111/63 |
| 846,529 | A | * | 3/1907 | Unger | B60B 15/02 301/40.1 |
| 1,145,667 | A | * | 7/1915 | Bremer | B60B 15/02 301/45 |
| 1,467,999 | A | * | 9/1923 | Brown | B60B 15/02 301/43 |
| 1,673,184 | A | * | 6/1928 | Cady | B60B 15/02 172/548 |
| 1,901,299 | A | * | 3/1933 | Johnson | A01C 5/068 172/536 |
| 2,330,308 | A | * | 9/1943 | Orendorff | A01C 5/068 172/538 |
| 2,341,770 | A | * | 2/1944 | Haas | A01C 5/068 172/538 |

(Continued)

FOREIGN PATENT DOCUMENTS

CA 2727188 A1 * 12/2009 ............. A01C 5/064

*Primary Examiner* — Tara Mayo-Pinnock
(74) *Attorney, Agent, or Firm* — William H. Honaker; Dickinson Wright PLLC (57) ABSTRACT A furrow closing wheel for closing an open furrow. The furrow closing wheel has a pair of rims mounted for rotation about a generally horizontal axis of rotation. The pair of rims are mounted at an angle with respect to one another with the rims being spaced apart. The distance between the rims decreases as the rims rotate from the top of the direction of rotation to the bottom of the direction of rotation and increases as the rims rotate from the bottom of the direction of rotation to the top of the direction of rotation. Spikes protrudes radially outwardly from the rims. Teeth extend inwardly and laterally from rims. The spikes are adapted to penetrate the sides of a furrow to crumble the furrow walls and push soil in the direction of the furrow opening and the teeth mesh to press down on the furrow to properly close the furrow.

53 Claims, 7 Drawing Sheets

(56) References Cited

U.S. PATENT DOCUMENTS

| | | | | | |
|---|---|---|---|---|---|
| 2,571,285 | A | * | 10/1951 | Oehler | A01C 5/068 |
| | | | | | 280/856 |
| 2,606,486 | A | * | 8/1952 | Klemm | A01C 5/068 |
| | | | | | 172/538 |
| 2,668,490 | A | * | 2/1954 | Oehler | B60B 15/26 |
| | | | | | 172/519 |
| 2,731,900 | A | * | 1/1956 | Oehler | A01C 5/068 |
| | | | | | 172/538 |
| 3,297,096 | A | * | 1/1967 | Wooldridge | E02F 5/30 |
| | | | | | 172/464 |
| 5,970,891 | A | * | 10/1999 | Schlegel | A01B 35/28 |
| | | | | | 111/135 |
| 8,291,998 | B1 | * | 10/2012 | Berg et al. | A01C 5/066 |
| | | | | | 172/173 |
| 8,550,020 | B2 | * | 10/2013 | Sauder et al. | F15B 11/042 |
| | | | | | 111/200 |
| 2007/0131153 | A1 | * | 6/2007 | Whalen et al. | A01C 5/066 |
| | | | | | 111/163 |
| 2012/0325133 | A1 | * | 12/2012 | Whalen et al. | A01C 5/066 |
| | | | | | 111/193 |
| 2016/0128266 | A1 | * | 5/2016 | Phely et al. | B60B 9/12 |
| | | | | | 172/556 |

* cited by examiner

FURROW CLOSING WHEEL ASSEMBLY

RELATED APPLICATIONS

This application claims the benefit of U.S. Provisional Application Ser. No. 62/500,357, filed May 2, 2017, which is incorporated herein by reference in its entirety.

STATEMENT REGARDING FEDERALLY SPONSORED RESEARCH

None.

TECHNICAL FIELD

This invention generally relates to agricultural equipment and more importantly to furrow closing wheels.

BACKGROUND OF THE INVENTION

As is well known, with machine seed planting, it is important to consistently and properly close the furrow once a seed has been deposited. Machine planting cuts a furrow in the soil into which seeds are dropped at specific desired locations. The furrow will have walls which can be compacted and if not properly eliminated, will adversely affect the growth of the seed's root structure. The walls of the furrow need to be collapsed or crumbled so that there is better soil to seed contact and no barrier to proper root growth.

It is also important that the furrow be properly closed. Proper closure of the furrow will provide better soil to seed contact and eliminate air pockets. Proper closure requires that the soil be moved over the seed, cover the seed, close the furrow and be pressed down to prevent reopening of the furrow and better soil to seed contact. The soil needs to be pressed down at a desired pressure to ensure proper growth of each seed and preferably, the entire width of the closed furrow needs to be pressed down.

Typical furrow closers do not have the ability to properly crumble the side wall for proper growth of the seed roots or to press down upon the entire furrow width. A typical furrow closer merely pushes the soil back in the direction of the furrow opening and does not in any way eliminate or crumble the sidewalls or press the soil down between the furrow wheels.

There are some furrow closing wheels that crumble the sidewalls and moving soil back into the furrow opening. But they do not properly close the furrow and press down the soil across the expanse of the furrow ensuring proper soil to seed contact, reduction of air pockets and eliminate reopening of the furrow.

The present invention solves the above problems.

SUMMARY OF THE INVENTION

In general terms, this invention provides a furrow closing wheel that penetrates the sides of the furrow walls to crumble the walls, provides better soil to seed contact and furrow closing and applies pressure to properly close the entire expanse of the closed furrow opening. The furrow closing wheel of the present invention provides better soil to seed contact, a properly filled and closed furrow opening, built in depth control and prevents the furrow from reopening.

In particular, the present invention provides radial spikes mounted to the rim of two opposed wheels. The spikes engage the walls of the furrow to crumble the furrow walls and push the soil in the direction of the furrow slot. The rim also pushes the soil down under the rim.

Additionally, intermeshing teeth extend laterally from the rim in the direction of the furrow. The teeth intermesh to press down the furrow between the opposed rims so that the entire expanse of the furrow is closed and pressed down.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

The furrow closing wheel assembly of the present invention is shown generally at 10. The furrow closing wheels 10 include a rim 12. The rim 12 has an outer surface 11, and inner surface 13, an inside edge 15 and outer edge 17. A plurality of spikes 14 protrude generally radially outwardly from the rim 12. Additionally, a plurality of teeth 16 extend inwardly and laterally away from the rim 12. The teeth 16 of adjacent rings intermesh as the wheels 10 rotate, see FIG. 2.

The spikes 14 can take various shapes. In the disclosed embodiment, each of the spikes has a knife edge 64. The shape of the spikes 14 is dictated by their ability to penetrate the soil, crumble the sidewalls of the furrow, push soil back into the furrow and be self-cleaning.

Figure 1:
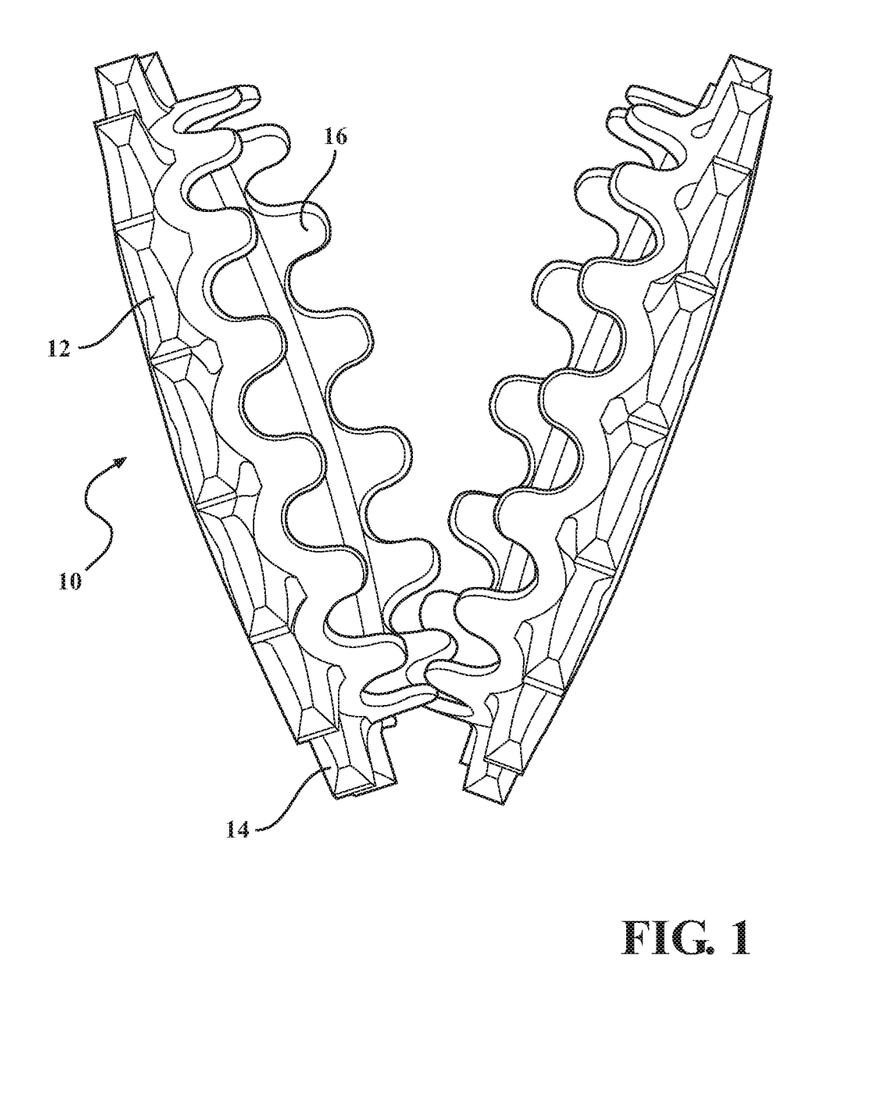
FIG. 1 is a perspective view of the furrow closing wheels of the present invention.
Figure 2:
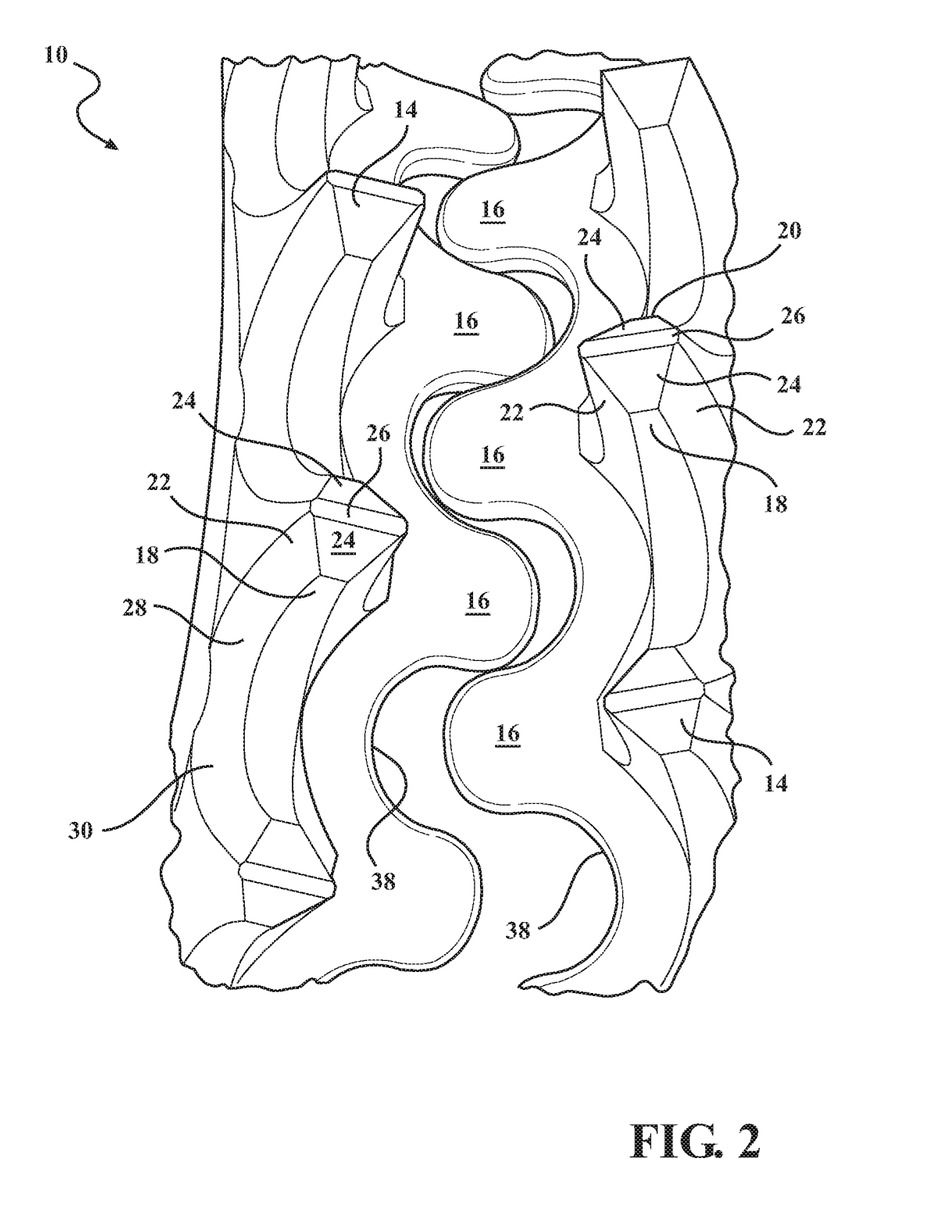
FIG. 2 is a partial perspective view of the furrow closing wheels of the present invention.

The spikes 14 as illustrated in FIGS. 1 and 2 have a front face 18 and rear face 20. The front and rear faces 18 and 20 are generally flat and extend radially outwardly from the rim 12. Angled sidewalls 22 extend away from the front and rear faces 18 and 20. An angled upper portion 24 joins the front and rear faces 18 and 20 and the angled sidewalls. The tooth is capped by a top flat surface 26. As illustrated, the spikes 14 are connected by curved valleys having a central curved surface 28 and sides 30.

Figure 3:
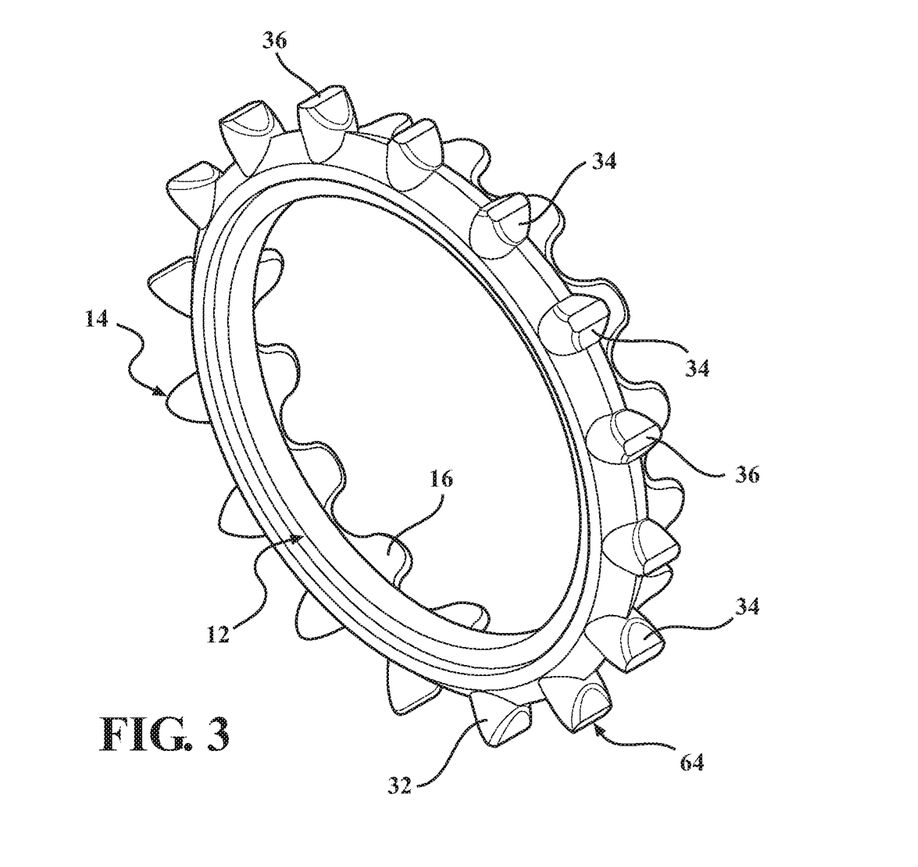
FIG. 3 illustrates a second embodiment of the furrow closing wheel of the present invention.
Figure 4:
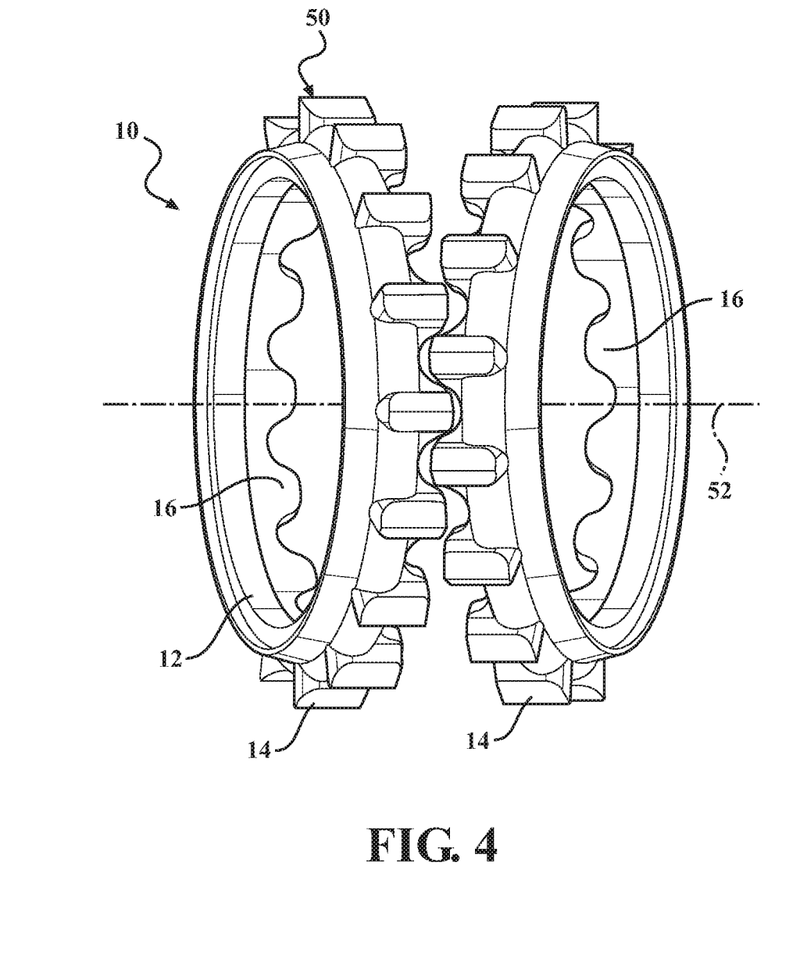
FIG. 4 is a perspective view of a further embodiment of the furrow closing wheel of the present invention as viewed from the bottom.
Figure 5:
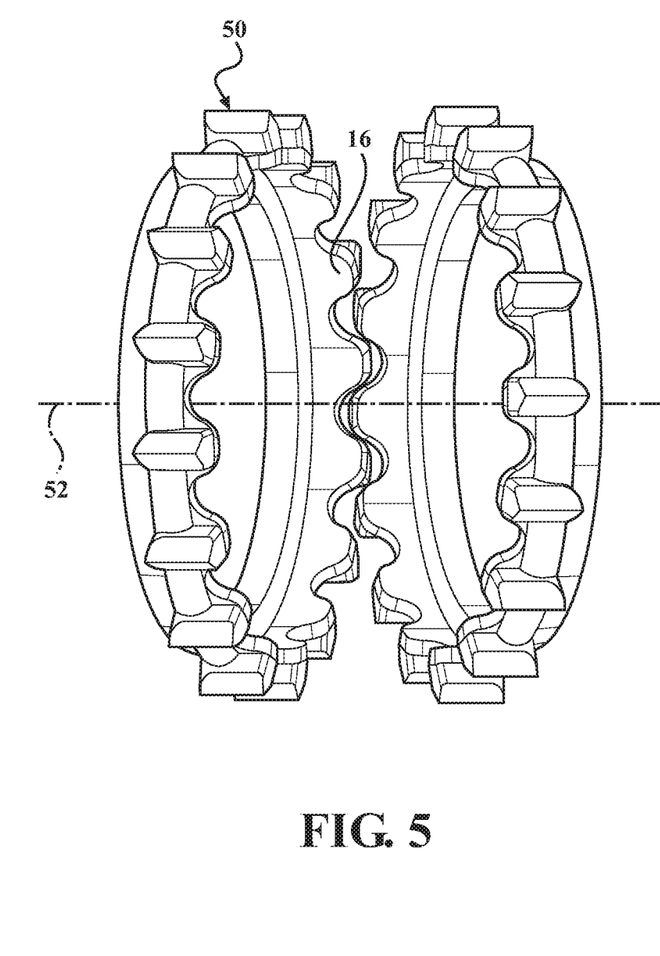
FIG. 5 is a perspective view of the embodiment of FIG. 4 as viewed from the top.
Figure 6:
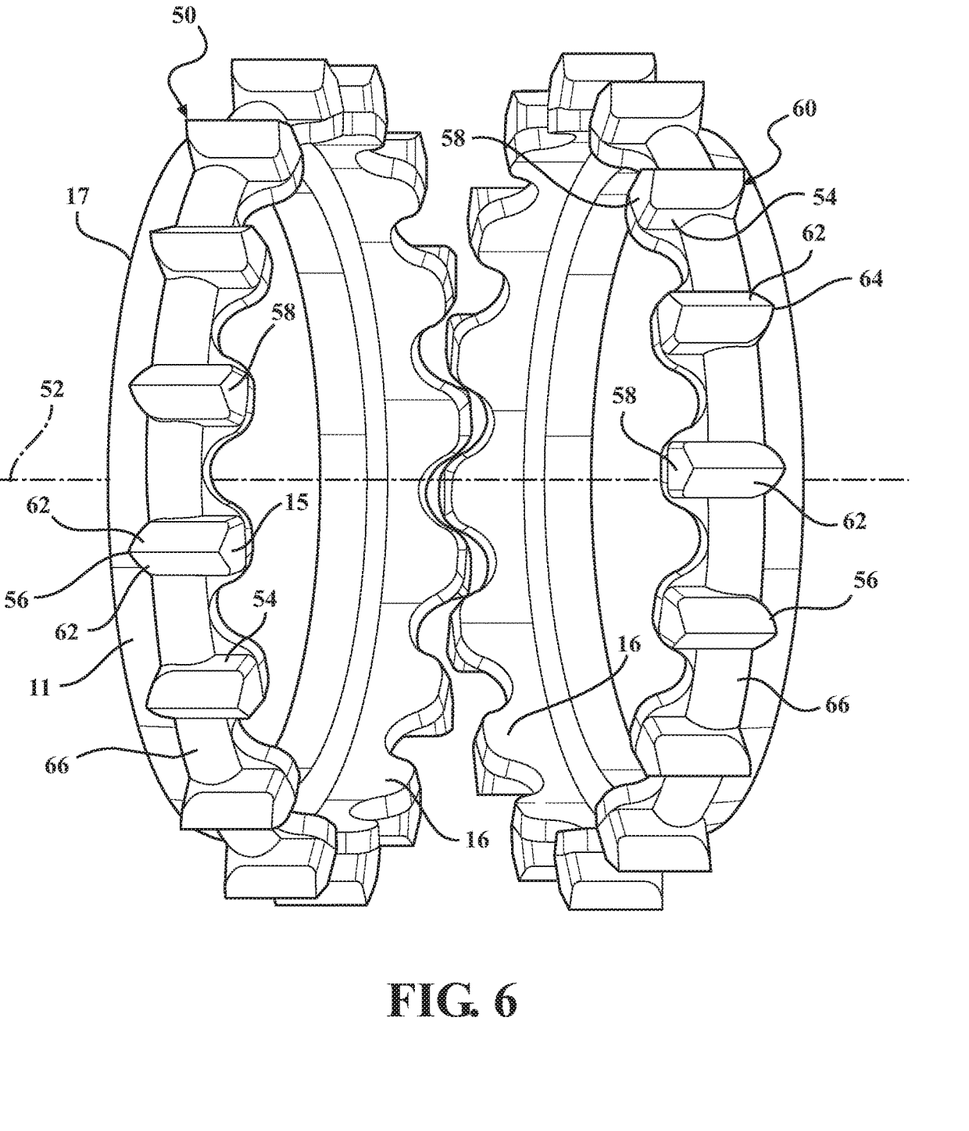
FIG. 6 is a partial perspective view of the embodiment of FIG. 4.
Figure 7:
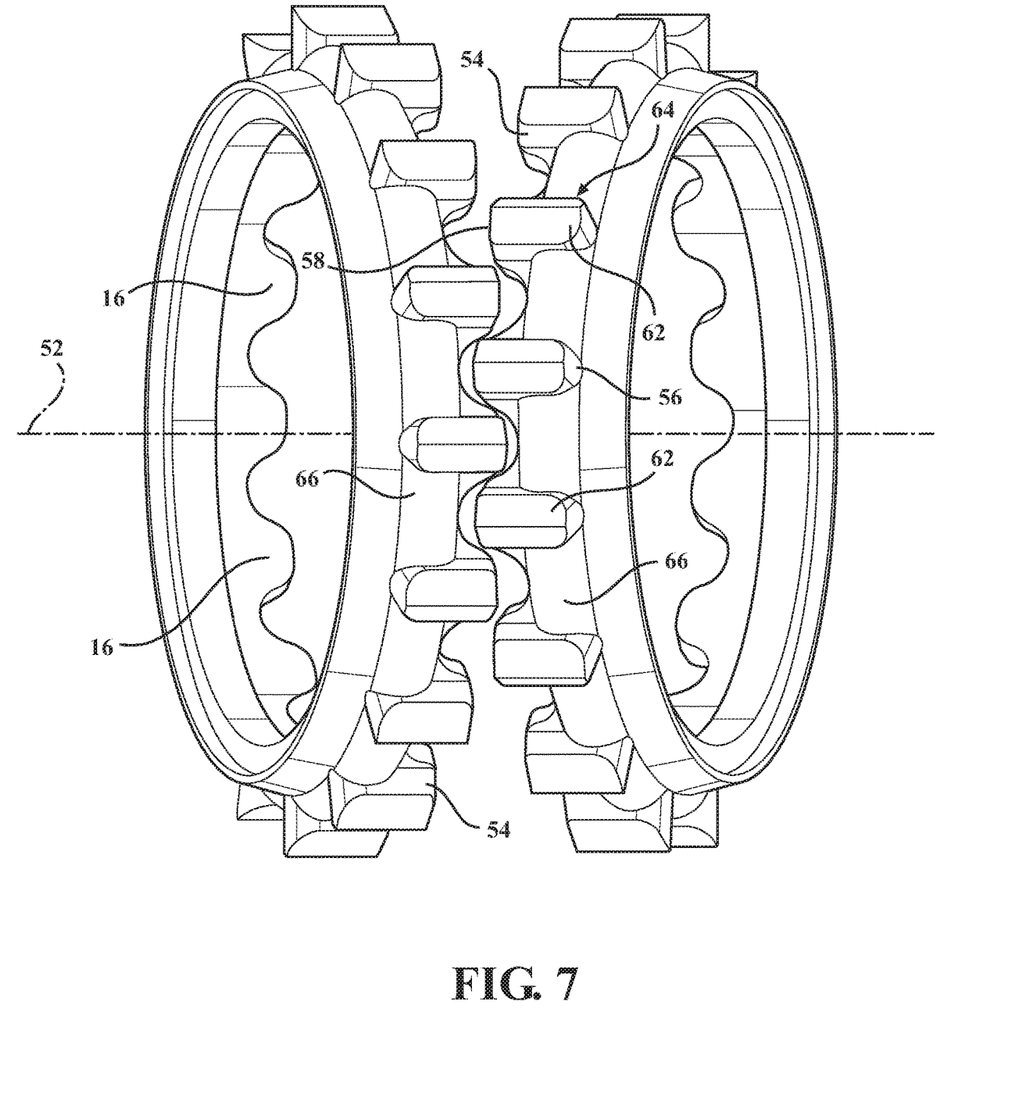
FIG. 7 is a partial perspective view of the embodiment of FIG. 4.

An alternative spike design is illustrated in FIG. 3. The spikes 14 as illustrated in FIG. 3 have a generally round base 32 which ends in opposed sloped surfaces 34. The terminus of the sloped surfaces is a flat top surface 36. In the disclosed embodiment, the sloped surfaces 34 are aligned with the forward direction of the furrow closing wheel 10.

The spikes 14 as illustrated in FIGS. 4 through 7 have an elongated body portion 50 extending generally parallel to the central axis 52. The body 50 is defined by spaced sidewalls 54 and end walls 56 and 58. In the disclosed embodiment, the end wall 56 is oval shaped and the end wall 58 is flat with rounded corners joining the side walls 54. The disclosed embodiment also includes a top 60 which has sloped sides 62 forming a knife edge 64.

The spikes 14 are joined by a semi round ridge 66 which protrudes up from the rim 12. The spikes 14 of this embodiment extend out to adjacent the free end of the teeth 16.

The shape of the spikes 14 facilitates the penetration of the spikes 14 into the soil and the ability of the wheels 10 to be self-cleaning. In the disclosed embodiment, there are 16 spikes. It will be appreciated by those of ordinary skill in the art that a different number of spikes could be used.

The spikes 14 engage the sides of the seed furrow to crumble the soil of the seed furrow wall. As will be appreciated, the seed furrow is formed as the seed planter moves through the field. The planter creates a slit in the ground that can have compacted walls that limit root growth. The spikes 14 penetrate into the sides of the furrow and crumble the compacted walls.

Additionally, the angled wheels 10 cause the spikes 14 to push the soil inwardly to close the furrow. The rim 12 also pushes the soil downwardly to partially seal the slot under the rim 12. As the spikes 16 push soil into the slot made by the planters; the area of rim 12 between the spikes 16 pushes down on the soil to help close the slot. Overall, the rim 12 and spikes 14 improve seed to soil contact, breakdown sidewall compaction and reduce air pockets in the soil.

The teeth 16 provide further sealing of the furrow opening. The spikes 14 penetrate the soil and push the soil inwardly to close the furrow opening. The rim 12 pushes the soil down, but the width is not sufficient to press down the soil across the entire width of the seed furrow. The seed furrow between the rims 12 is not engaged by the rims 12. The teeth 16 on the adjacent wheels 10 mesh as illustrated to form a partially closed surface, defined by the meshed teeth 16. The meshed teeth 16 provide a closing surface that extends over the portion of the furrow that is not engaged by the rim 12. This ensures that the furrow is completely closed across its entire width.

The teeth 16 begin to mesh just before the bottom of the rotation of wheels 10, then they mesh at the bottom to press the soil down and open just after the bottom of the rotation. This facilitates the closing, but also the self-cleaning of the teeth 16.

As illustrated, the teeth 16 have rounded concave profiles that are joined by rounded convex valleys 38. At the bottom of the rotation of the wheel 10, the teeth 16 mate with the valleys 38 of the adjacent wheel to create a closed or partially closed surface to press down the soil into the furrow as the wheel rotates over the furrow. It should be understood that the teeth 16 can have other profiles, such as for example, square, triangular, etc.

With reference to the figures, the spikes 14 are illustrated as being offset. In this way, the spikes 14 penetrate the furrow opening in a generally S-shaped configuration which improves the movement of the soil back into the furrow. The spikes 14 penetrate the sides of the furrow row with the spikes 14 offset from one another instead of directly across from one another. Since wheel 10 is moving in a forward direction, the spikes 14 penetrate and push the side of the furrow row in the direction of the slot as the opposite spike 14 is entering the other side of the furrow row. The S-shaped pattern creates a better closing action than would be obtained from spikes that are mounted directly across from one another.

Figure 8:
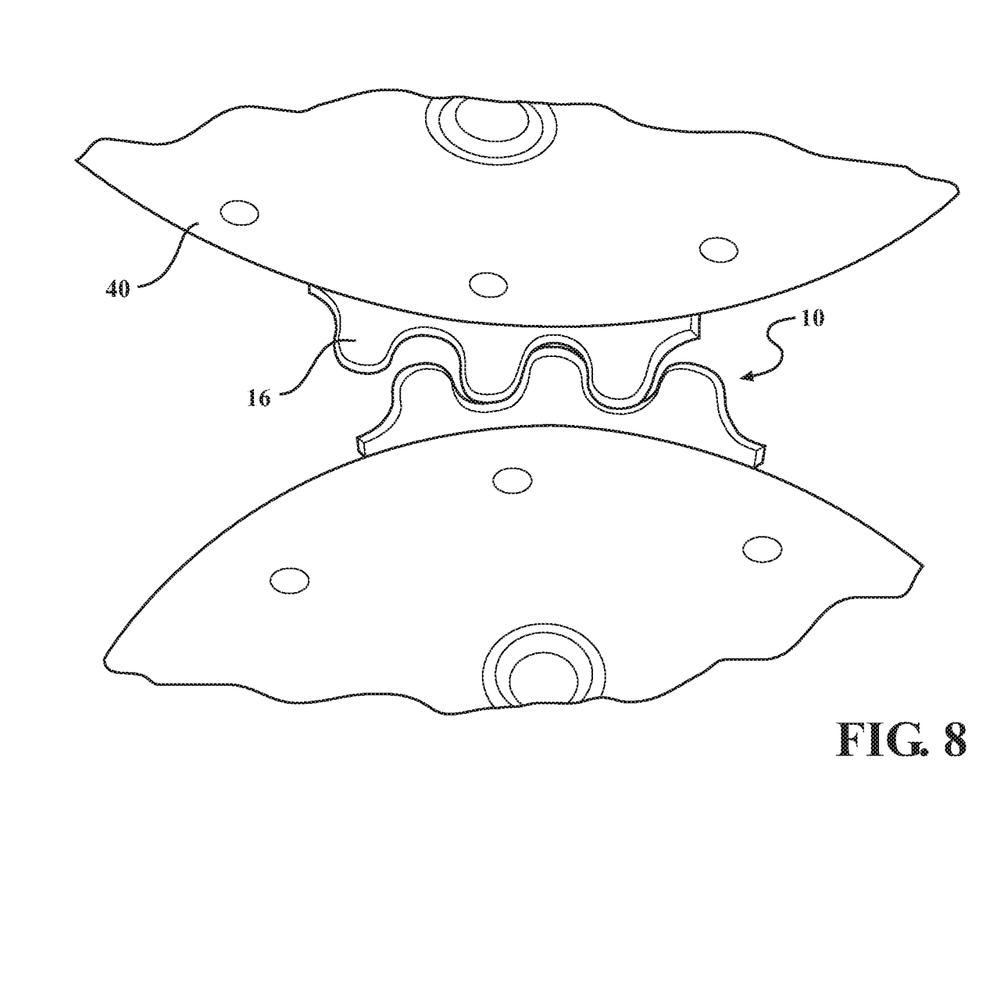
FIG. 8 is a view of a section of the furrow closing wheel of the present invention mounted to a hub.

In the preferred embodiment, the wheels 10 are made of plastic which can be easily mounted on to a standard furrow closing hub 40. See FIG. 8. It is also within the scope of the invention that the wheels 10 can be made of metal, such as stainless steel, iron, or aluminum for example. Additionally, the wheels 10 could be made in a solid loop, or a number of segments for attachment to a furrow closing hub.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

I claim:

1. A furrow closing wheel assembly for engaging the ground, said furrow closing wheel assembly comprising:
a pair of rims mounted for rotation about a generally horizontal axis of rotation, said pair of rims each having an outer and inner surface extending generally parallel to the axis of rotation and inside and outside edges extending generally perpendicular to the axis of rotation, said pair of rims being mounted at an angle with respect to one another, said rims being spaced apart with the distance between the rims decreasing as said pair of rims rotate from the top of direction of rotation to the bottom of direction of rotation and increases as said rims rotate from the bottom of direction of rotation to the top of direction of rotation;
a first plurality of spikes protruding radially outwardly from one of said rims and a second plurality of spikes protruding radially outwardly from said other of said rims;
a first plurality of teeth extending inwardly and laterally from one of said rims and a second plurality of teeth extending inwardly and laterally from the other of said rims;
said first plurality of teeth being rotationally offset from said second plurality of teeth, said first and second plurality of teeth meshing adjacent said bottom of rotation;
whereby said spikes are adapted to penetrate the sides of a furrow to crumble the furrow walls and push soil in the direction of the furrow opening and the teeth mesh to press down on the furrow to properly close the furrow.

2. The furrow closing wheel assembly of claim 1, wherein each of said first and second plurality of teeth have rounded concave profiles.

3. The furrow closing wheel assembly of claim 2, wherein each of said first plurality of teeth are separated by a first rounded convex valley and each of said second plurality of teeth are separated by a second rounded convex valley, each of said first plurality of teeth being received in a second rounded convex valley and each of said second plurality of teeth being received in a first rounded convex valley, as said pair of rims rotate to the bottom of rotation.

4. The furrow closing wheel assembly of claim 1, wherein each of said first and second plurality of spikes are separated by a concave surface.

5. The furrow closing wheel assembly of claim 4, wherein each of said concave surfaces is curved.

6. The furrow closing wheel assembly of claim 1, wherein each of said first and second plurality of spikes has a body terminating in a knife edge spaced from said outer surface.

7. The furrow closing wheel assembly of claim 6, wherein said body has front and rear faces extending from said rim generally perpendicular to the direction of rotation and sidewalls defined by angled walls extending from said front and rear faces and joined at an apex adjacent said inside and outside edges.

8. The furrow closing wheel assembly of claim 7, wherein said knife edge includes angled upper portions joining said front and rear faces.

9. The furrow closing wheel of assembly claim 6, wherein said knife edge terminates in a top flat surface.

10. The furrow closing wheel assembly of claim 6, wherein said body is generally a round tube.

11. The furrow closing wheel assembly of claim 10, wherein said knife edge includes angled upper portions.

12. The furrow closing wheel assembly of claim 11, wherein said knife edge terminates in a top flat surface.

13. The furrow closing wheel assembly of claim 6, wherein said body is extending generally parallel said axis of rotation.

14. The furrow closing wheel assembly of claim 13, wherein said body is defined by spaced sidewalls and end walls, one of said end walls is oval shaped and the other end wall is flat.

15. The furrow closing wheel assembly of claim 14, wherein said side walls are joined by rounded corners.

16. The furrow closing wheel assembly of claim 15, wherein said knife edge is defined by sloped sides.

17. The furrow closing wheel assembly of claim 1, wherein said spikes are joined by a semi round ridge which protrudes from said outer surface of said rim.

18. The furrow closing wheel assembly of claim 1, wherein said spikes extend to adjacent the free end of the teeth 16.

19. An attachment for a furrow closing wheel, said attachment comprising:
a rim adapted to be mounted for rotation about a generally horizontal axis of rotation, said rim having an outer and inner surface extending generally parallel to the axis of rotation and inside and outside edges extending generally perpendicular to the axis of rotation;
a plurality of spikes protruding radially outwardly from said rim;
a plurality of teeth extending inwardly and laterally from said rim, said teeth having an upper surface and a lower surface, said upper surface faces in the same direction as said outer surface of said rim, said upper surface is flat to press down upon and close a furrow as said rim rotates about said axis of rotation;
whereby said rim is adapted to be mounted at an angle with respect to an adjacent rim, said rims being adapted to be spaced apart with the distance between the rims decreasing as the rims rotate from the top of direction of rotation to the bottom of direction of rotation and increases as said rims rotate from the bottom of direction of rotation to the top of direction of rotation; said spikes being adapted to penetrate the sides of a furrow to crumble the furrow walls and push soil in the direction of the furrow opening and said teeth mesh to press down on the furrow to properly close the furrow.

20. The attachment for a furrow closing wheel of claim 19, wherein said plurality of teeth have rounded concave profiles.

21. The attachment for a furrow closing wheel of claim 20, wherein said plurality of teeth are separated by a first rounded convex valley.

22. The attachment for a furrow closing wheel of claim 19, wherein said plurality of spikes are separated by a concave surface.

23. The attachment for a furrow closing wheel of claim 22, wherein each of said concave surfaces is curved.

24. The attachment for a furrow closing wheel of claim 19, wherein said plurality of spikes has a body terminating in a knife edge spaced from said outer surface.

25. The attachment for a furrow closing wheel of claim 24, wherein said body has front and rear faces extending from said rim generally perpendicular to the direction of rotation and sidewalls defined by angled walls extending from said front and rear faces and joined at an apex adjacent said inside and outside edges.

26. The attachment for a furrow closing wheel of claim 25, wherein said knife edge includes angled upper portions joining said front and rear faces.

27. The attachment for a furrow closing wheel of claim 26, wherein said knife edge terminates in a top flat surface.

28. The attachment for a furrow closing wheel of claim 24, wherein said body is generally a round tube.

29. The attachment for a furrow closing wheel of claim 28, wherein said knife edge includes angled upper portions joining said front and rear faces, said front and rear surfaces being generally perpendicular to the direction of rotation.

30. The attachment for a furrow closing wheel of claim 24, wherein said knife edge terminates in a top flat surface.

31. The attachment for a furrow closing wheel of claim 24, wherein said body is extending generally parallel to said axis of rotation.

32. The attachment for a furrow closing wheel of claim 31, wherein said body is defined by spaced sidewalls and end walls, one of said end walls is oval shaped and the other end wall is flat.

33. The attachment for a furrow closing wheel of claim 32, wherein said side walls are joined by rounded corners.

34. The attachment for a furrow closing wheel of claim 33, wherein said knife edge is defined by sloped sides.

35. The attachment for a furrow closing wheel of claim 19, wherein said spikes are joined by a semi round ridge which protrudes from said outer surface of said rim.

36. The attachment for a furrow closing wheel of claim 19, wherein said spikes extend to adjacent the free end of the teeth.

37. An attachment for a furrow closing wheel, said attachment comprising:
a rim adapted to be mounted for rotation about a generally horizontal axis of rotation, said rim having an outer and inner surface extending generally parallel to the axis of rotation and inside and outside edges extending generally perpendicular to the axis of rotation;
a plurality of spikes protruding radially outwardly from said rim;
a plurality of teeth extending inwardly and laterally from said rim;
said spikes extend to adjacent the free end of the teeth;
whereby said rim is adapted to be mounted at an angle with respect to an adjacent rim, said rims being adapted to be spaced apart with the distance between the rims decreasing as the rims rotate from the top of direction of rotation to the bottom of direction of rotation and increases as said rims rotate from the bottom of direction of rotation to the top of direction of rotation; said spikes being adapted to penetrate the sides of a furrow to crumble the furrow walls and push soil in the direction of the furrow opening and said teeth mesh to press down on the furrow to properly close the furrow.

38. The attachment for a furrow closing wheel of claim 37, wherein said plurality of teeth have rounded concave profiles.

39. The attachment for a furrow closing wheel of claim 38, wherein said plurality of teeth are separated by a first rounded convex valley.

40. The attachment for a furrow closing wheel of claim 37, wherein said plurality of spikes are separated by a concave surface.

41. The attachment for a furrow closing wheel of claim 40, wherein each of said concave surfaces is curved.

42. The attachment for a furrow closing wheel of claim 37, wherein said plurality of spikes has a body terminating in a knife edge spaced from said outer surface.

43. The attachment for a furrow closing wheel of claim 42, wherein said body has front and rear faces extending from said rim generally perpendicular to the direction of rotation and sidewalls defined by angled walls extending from said front and rear faces and joined at an apex adjacent said inside and outside edges.

44. The attachment for a furrow closing wheel of claim 43, wherein said knife edge includes angled upper portions joining said front and rear faces.

45. The attachment for a furrow closing wheel of claim 44, wherein said knife edge terminates in a top flat surface.

46. The attachment for a furrow closing wheel of claim 42, wherein said body is generally a round tube.

47. The attachment for a furrow closing wheel of claim 46, wherein said knife edge includes angled upper portions joining said front and rear faces, said front and rear surfaces being generally perpendicular to the direction of rotation.

48. The attachment for a furrow closing wheel of claim 42, wherein said knife edge terminates in a top flat surface.

49. The attachment for a furrow closing wheel of claim 42, wherein said body is extending generally parallel to said axis of rotation.

50. The attachment for a furrow closing wheel of claim 49, wherein said body is defined by spaced sidewalls and end walls, one of said end walls is oval shaped and the other end wall is flat.

51. The attachment for a furrow closing wheel of claim 50, wherein said side walls are joined by rounded corners.

52. The attachment for a furrow closing wheel of claim 51, wherein said knife edge is defined by sloped sides.

53. The attachment for a furrow closing wheel of claim 37, wherein said spikes are joined by a semi round ridge which protrudes from said outer surface of said rim.

* * * * *